United States Patent
Patoglu (10) Patent No.: US 10,857,664 B2
(45) Date of Patent: *Dec. 8, 2020

(54) EXOSKELETON

(71) Applicant: Sabanci University, Istanbul (TR)

(72) Inventor: Volkan Patoglu, Istanbul (TR)

(73) Assignee: Sabanci University, Istanbul (TR)

( * ) Notice: Subject to any disclaimer, the term of this patent is extended or adjusted under 35 U.S.C. 154(b) by 997 days.

This patent is subject to a terminal disclaimer.

(21) Appl. No.: 15/400,413

(22) Filed: Jan. 6, 2017

(65) Prior Publication Data

US 2017/0182654 A1 Jun. 29, 2017

Related U.S. Application Data

(63) Continuation of application No. 13/529,437, filed on Jun. 21, 2012, now Pat. No. 9,539,724.

(Continued)

(51) Int. Cl.
*A61H 1/02* (2006.01)
*B25J 9/00* (2006.01)

(52) U.S. Cl.
CPC ............ *B25J 9/0006* (2013.01); *A61H 1/024* (2013.01); *A61H 1/0281* (2013.01);
(Continued)

(58) Field of Classification Search
CPC ........ B25J 9/0006; B25J 9/003; B25J 9/0036; B25J 9/0048; B25J 9/0045; A61H 1/024; A61H 1/0244; A61H 1/0277; A61H 1/0281; A61H 2205/062; A61H 2205/088; A61H 2205/102

See application file for complete search history.

(56) References Cited

U.S. PATENT DOCUMENTS

| 4,936,206 A | 6/1990 | Miles et al. |
| 5,581,437 A | 12/1996 | Sebillotte et al. |

(Continued)

FOREIGN PATENT DOCUMENTS

| CN | 2762940 Y | 3/2006 |
| CN | 201168163 Y | 12/2008 |

(Continued)

OTHER PUBLICATIONS

International Search Report for corresponding European Application No. PCT/EP2012/002628 dated Oct. 22, 2012.

(Continued)

*Primary Examiner* — Timothy A Stanis
(74) *Attorney, Agent, or Firm* — Renner, Otto, Boisselle & Sklar, LLP (57) ABSTRACT

An exoskeleton for humans including a joint element that interacts directly or indirectly with a human's joint via an end-effector mount, wherein the end-effector mount is arranged to perform an arbitrary planar parallel movement in a plane, allowing superimposed translational and rotational movements of the end-effector mount relative to a body of the joint element. The exoskeleton allows for excellent adjustment of the joint axes, i.e. the exoskelleton's and the human's joint, for effecting simultaneous translational and rotational movements. Particularly, the exoskeleton is self-aligning to the movements of a human's joint independent from differences in the attachment of the exoskeleton to the body and anatomical differences of the patients.

17 Claims, 9 Drawing Sheets

Related U.S. Application Data (60) Provisional application No. 61/499,663, filed on Jun. 21, 2011.

(52) U.S. Cl.
CPC ..... *B25J 9/0003* (2013.01); *A61H 2201/1207* (2013.01); *A61H 2201/1616* (2013.01); *A61H 2201/1664* (2013.01)

(56) References Cited

U.S. PATENT DOCUMENTS

| | | |
|---|---|---|
| 6,581,437 B2 | 6/2003 | Chrystall et al. |
| 7,892,154 B1 | 2/2011 | Alexa |
| 9,180,488 B2 | 11/2015 | Qi et al. |
| 2003/0115954 A1 | 6/2003 | Zemlyakov et al. |
| 2004/0054311 A1 | 3/2004 | Sterling |
| 2004/0097330 A1 | 5/2004 | Edgerton et al. |
| 2007/0021836 A1 | 1/2007 | Doty |
| 2007/0225620 A1 | 9/2007 | Carignan et al. |
| 2008/0009771 A1 | 1/2008 | Perry et al. |
| 2008/0304935 A1 | 12/2008 | Scott |
| 2010/0286950 A1 | 11/2010 | Heijkants et al. |
| 2010/0331150 A1 | 12/2010 | Patoglu |
| 2011/0306473 A1 | 12/2011 | Saglia et al. |
| 2011/0313331 A1 | 12/2011 | Dehez et al. |
| 2012/0090423 A1 | 4/2012 | Helmer |

FOREIGN PATENT DOCUMENTS

| | | |
|---|---|---|
| CN | 101966116 A | 2/2011 |
| CN | 101999970 A | 6/2011 |
| JP | A-2007275482 | 10/2007 |
| JP | A-2010202572 | 9/2010 |
| JP | A-2011-45984 | 9/2011 |
| KR | 2009 0036177 A | 4/2009 |
| WO | 97/09153 A1 | 3/1997 |
| WO | 2008/131563 A1 | 11/2008 |
| WO | 2011/127410 A2 | 10/2011 |
| WO | 2008/003416 A1 | 4/2012 |

OTHER PUBLICATIONS

Chinese Office Action for corresponding Chinese Patent Application No. 201280030701.9 dated Feb. 28, 2015.

Bing Fang, "Study on singularity of three degree-of-freedom parallel mechanism and four degree-of-freedom parallel mechanism", Chinese Master's Theses Full-text Database, Information Science and Technology, Ninth Edition, Sep. 15, 2009.

Japanese Search Report for corresponding Japanese Patent Application No. 2014-516225 dated Mar. 30, 2016.

EXOSKELETON

RELATED APPLICATION

This application is a continuation of U.S. application Ser. No. 13/529,437 filed Jun. 21, 2012, and published in the English, which claims the benefit of U.S. Provisional Application No. 61/499,663 filed Jun. 21, 2011, and also claims priority of PCT/EP2012/002628 filed Jun. 21, 2012, all of which are hereby incorporated herein by reference in their entireties.

FIELD OF THE INVENTION

Powered exoskeletons are used for example for robot-assisted rehabilitation of patients having neurological injuries. For such exoskeletons joints are required that have motion capabilities that correspond to the motion capabilities of humans.

PRIOR ART

Neurological injuries are the leading cause of serious, long-term disability. Each year about 15 million people suffer a stroke. According to the National Stroke Association of US, the estimated the cost per patient in the first 3 months of treatment is about 15 thousand dollars. Moreover, for 10% of cases these costs exceed 35 thousand dollars. The situation gets even more serious with the ageing of the population, in particular, in the EU countries and Japan.

Physical rehabilitation therapy is indispensable for treating neurological disabilities. Therapies are more effective when exercises are repetitive, intense, long term and task specific. However, repetitive therapies with high intensity are costly due to the physical burden and the manual labor involved.

In recent years, the use of electro-mechanical systems for rehabilitation has become ubiquitous, thanks to recent advances on human machine interaction research. Assistance of repetitive and physically involved rehabilitation exercises using robotic devices not only helps eliminate the physical burden of movement therapy for the therapists, but also decreases application related costs. Moreover, robot-mediated rehabilitation therapy allows quantitative measurements of patient progress and can be used to realize customized, interactive treatment protocols. Rehabilitation robots increase the reliability, accuracy, and effectiveness of traditional physical rehabilitation therapies, enable active participation of patients by assisting patients only as-needed, render easy tuning of duration and intensity of therapies feasible, can be applied to patients with all levels of impairment, motivate patients to endure intense therapy sessions thanks to virtual reality integration, and are capable of realizing new treatment protocols with virtual environments and haptic feedback. In the literature, beneficial effects of robot assisted rehabilitation over conventional physical therapy have been shown through clinical trials.

Upper-limb rehabilitation devices can be categorized in three main categories: end-effector type robots, cable suspension systems and exoskeletons. End-effector type rehabilitation robots feature a single interaction point (the end-effector) with the patient and the joint motions of these devices do not correspond to human movements. Therefore, without external restraints applied to constrain the patient, joint specific therapies cannot be delivered by such mechanisms. Moreover, compensatory movements of the patient cannot be detected when these devices are used. On the other hand, end-effector type robots are advantageous thanks to their simple kinematic structure and low cost.

A well-known example of end-effector type rehabilitation robot is MIT-Manus. MIT-Manus is an impedance-type robot that possesses two grounded direct-drive motors to provide torques to assist or resist patient movements. Another example of such devices is the Gentle/s, which uses an admittance-type robot (HapticMaster) along with a gimbal mechanism to connect to the human wrist. Reha-Slide is another fixed base device which is designed to administer resistive movement therapies. Reha-Slide has two holders which are horizontally placed on a table and enables forward and backward arm movements. End-effector type robots have also been used to impose bimanual exercises. In particular, MIME system based on an admittance controlled 6 degrees-of-freedom (DoF) PUMA robot has been used to deliver mirror image therapies.

Cable suspension devices help mobilize the upper-limb of the body by compensating for the gravitational forces. These devices are passive systems with simple kinematic structure; therefore, cable suspension devices are low cost. However, these devices cannot assist or resist to patients while completing therapeutic tasks and they lack measurement capabilities.

In contrast to end-effector type robots, exoskeletons are attached to the human limb at multiple interaction points and movement of these devices correspond with human joints. As a result, exoskeletons are capable of applying controlled torques to individually targeted joints and measuring the movements of these specific joints decoupled from movements of the other joints. Unfortunately, exoskeletons possess more complex kinematic structure compared to end-effector type robots and hence are more costly. The exoskeletons can be further grouped into three categories.

Orthoses constitute the first group of exoskeletons. Orthoses aim to physically support people while performing daily tasks. HAL-5 full-body exoskeleton is an example of such orthoses ("Robot suit HAL", http://www.cyberdyne.jp/english/robotsuithal/index.html). Another example of such orthoses is the Myomo robot ("Myomo," http://www.myomo.com/myomo_product_stroke_rehabilitation_arm_brace_technology_overview.as p), an elbow orthosis. Another well-known orthoses is the Rewalker (A. Goffer, "Gait-locomotor apparatus", U.S. Pat. No. 7,153,242). In contrast to Myomo, Rewalker orthoses is specifically built for lower limb to support users during gait movements.

The second group is composed of the augmentation exoskeletons. These robots are designed for healthy users and aim help users to achieve heavy duty tasks that require high muscle power. One of the early representatives of this group is Exos ArmMaster (V. Bin Massie, Thomas A N. H.; Vayner", Sensory feedback exoskeleton armmaster," patent application WO/1995/032 842), an upper-extremity exoskeleton with 5 DoF. Another example of augmentation exoskeletons is the BLEEX (A. Zoss, H. Kazerooni, and A. Chu, "Biomechanical design of the berkeley lower extremity exoskeleton (BLEEX)," Mechatronics, IEEE/ASME Transactions on, vol. 11, no. 2, pp. 128-138, 2006). In contrast to Exos ArmMaster, BLEEX is a lower-extremity exoskeleton developed to augment muscle power of people who work on rough terrains for long time. Another exoskeleton deigned for human augmentation is the XOS 2 robot ("XOS 2 Exoskeleton", http://www.raytheon.com/newsroom/technology/rtn08_exoskeleton/). Similar to BLEEX, XOS 2 is also designed for physically challenging tasks; however, XOS 2 is for the upper body. Finally, the third group of exoskeletons is designed specifically for rehabilitation.

Unlike the other two groups, rehabilitation robots are designed for clinical use. Consequently, most of the robots on this group are grounded to a fixed base and are immobile.

Figure 1:
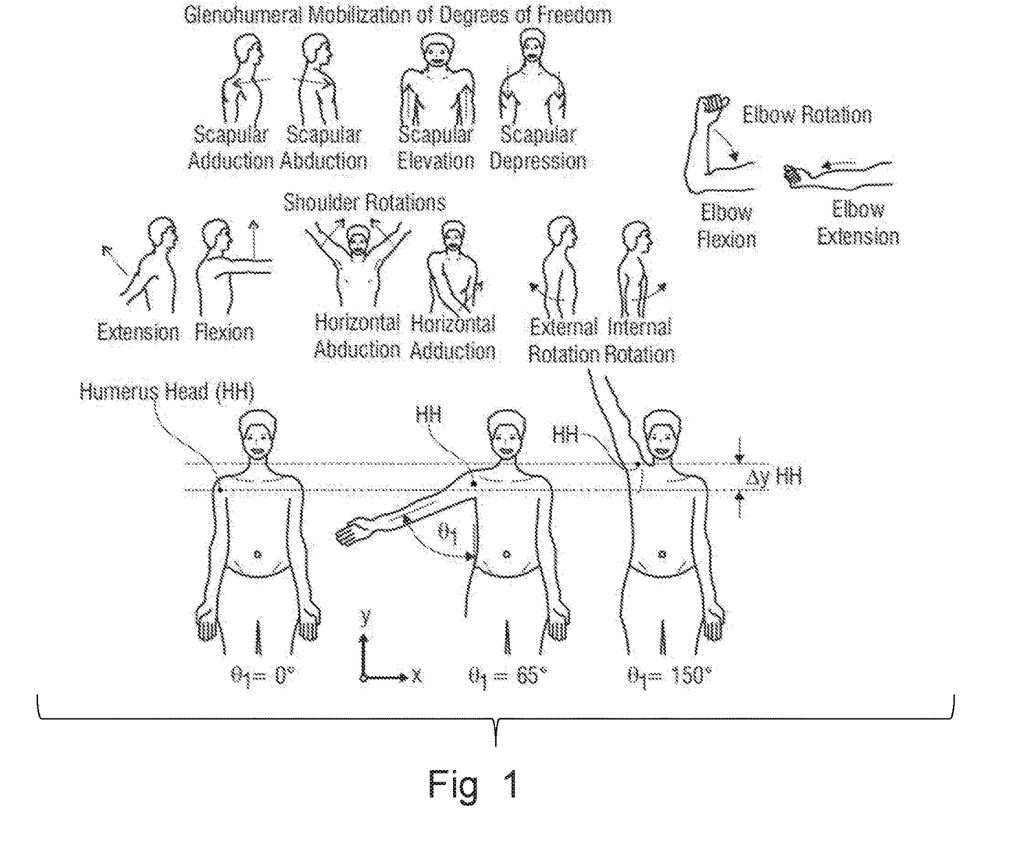
FIG. 1 depicts shoulder and elbow movements.
Figure 2:
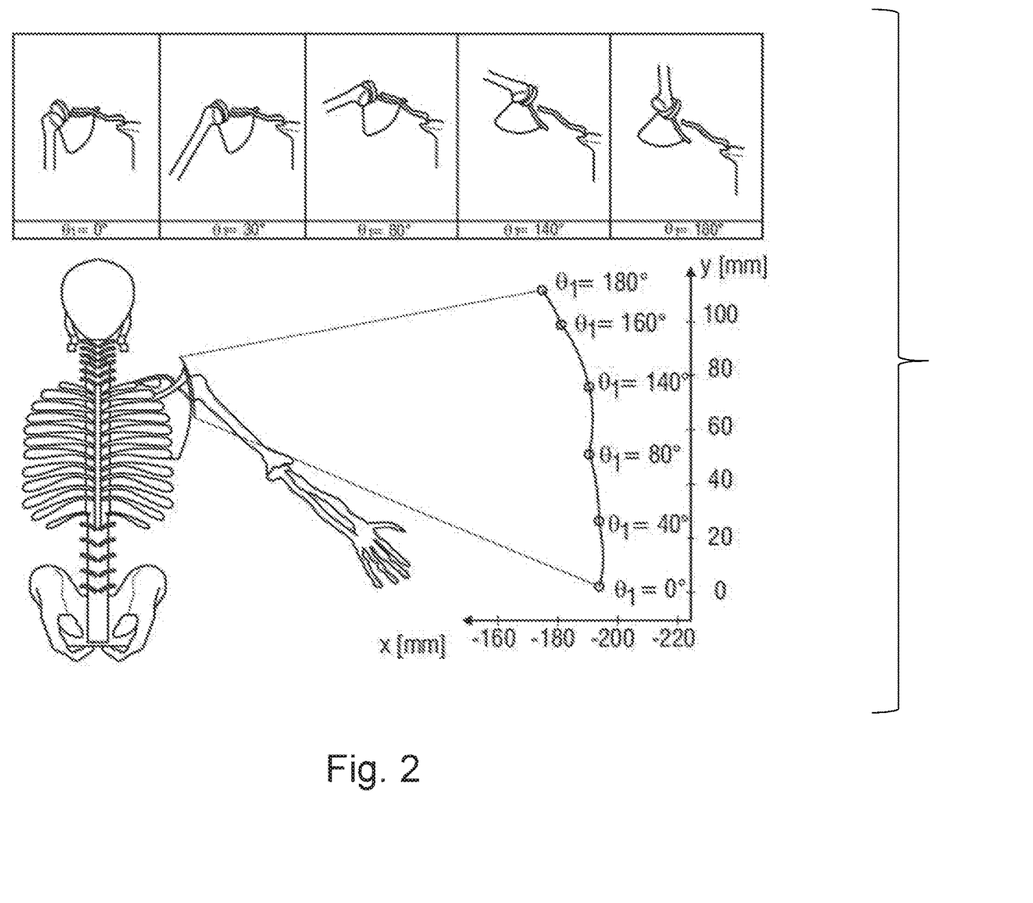
FIG. 2 illustrates the scapulohumeral rhythm at the shoulder

Correspondence of human joint axes with robot axes is an imperative criteria while designing exoskeleton for rehabilitation. Possible misalignment in rehabilitation exoskeletons may cause discomfort or pain, can even lead to the dislocation of the joint. Adjusting robot joint axes to match the human axes is a tedious process that may take up 10-15 minutes of precious therapy duration. There are 3 main reasons leading to joint misalignments: Firstly, human joints cannot be modeled as simple revolute joints. For example the shoulder joint has extra two translational DoF movements in addition to three rotational DoFs (cf. FIG. 1). In addition to decoupled movements of the two translational DoFs, vertical translation of the shoulder is tightly coupled with the elevational rotation of the joint. This coupling is known as scapulohumeral rhythm (cf. FIG. 2). Secondly, the exact position of the human joints cannot be determined externally without using special imaging techniques. Observing the bone locations with naked eyes can only give a basic idea on possible alignment of the joint. The exact motion of joints shows wide variation among humans, as this motion depends on size and orientation of shoulder bones, shape of articulated surfaces and constraints imposed by ligaments, capsules, and tendons. Lastly, placement of the human limb on the exoskeleton may change from one therapy session to another and even if these changes are known, joint re-alignment is still needed to be completed.

A well-known example of rehabilitation exoskeletons is the ARMin robot (T. Nef, M. Mihelj, G. Kiefer, C. Perndl, R. Muller, and R. Riener, "ARMin—Exoskeleton for arm therapy in stroke patients," in Re-habilitation Robotics, 2007. ICORR 2007. IEEE 10th International Conference on, 2007, pp. 68-74). The first version of this robot, ARMin I, is composed of an exoskeleton elbow and forearm robot attached to an end-effector type shoulder mechanism. The shoulder mechanism of ARMin I is modeled as a 3 DoF spherical joint. Since human shoulder has 5 DoF, ARMin I is unable to impose ergonomic movements to patients. The next version of the robot, ARMin II (M. Mihelj, T. Nef, and R. Riener, "ARMin II—7 DoF rehabilitation robot: mechanics and kinematics," in Robotics and Automation, 2007 IEEE International Conference on, 2007, pp. 4120-4125), has drastically decreased the ergonomic problems by including an extra vertical translational DoF to the shoulder joint. On the other hand the additional DoF increases the kinematic complexity of the robot. In the final version, ARMin III (T. Nef, M. Guidali, and R. Riener, "ARMin III—Arm therapy exoskeleton with an ergonomic shoulder actuation," Applied Bionics and Biomechanics, vol. 6, no. 2, pp. 127-142, 2009) the shoulder joint is simplified by eliminating passive robot elements and ergonomic movement is achieved by circular shoulder joint movement. Since the ARMin III has a simpler kinematic structure, the cost is decreased with respect to ARMin II, consequently the ergonomy of the robot is deteriorated as well. As a result ARMin III cannot fully correspond to human joints.

Ergonomic shoulder joint is one of the major design criteria for the MGA exoskeleton robot (C. Carignan, M. Liszka, and S. Roderick, "Design of an arm exoskeleton with scapula motion for shoulder rehabilitation," in Advanced Robotics, 2005. ICAR '05. Proceedings., 12th International Conference on, 2005, pp. 524-531). Similar to ARMin III, MGA exoskeleton also models the shoulder movements on a circular path to sustain ergonomy. In particular, MGA exoskeleton allows for active adjustment to scapula rotation through use of an extra actuated revolute joint in series with 3 actuators forming a spherical joint. Hence, MGA exoskeleton cannot account for all 5 DoF movement of the human shoulder and adjustment of link lengths are necessary for each patient such that the resulting shoulder movement closely approximates the real one.

The document W. Chen, C. Xiong, R. Sun, and X. Huang, "On the design of exoskeleton rehabilitation robot with ergonomic shoulder actuation mechanism," in Proceedings of the 2nd International Conference on Intelligent Robotics and Applications, ser. ICIRA '09. Springer-Verlag, 2009, pp. 1097-1110 describes the development of an upper-extremity exoskeleton robot with de coupled shoulder movements. The shoulder of the robot is designed with 6 DoF kinematic structure and with the help of extra DoF, shoulder ergonomy for different patients is sustained. On the other hand, the extra DoF introduces kinematic complexity to the robot and increases the footprint and weight of the shoulder mechanism.

Dampace exoskeleton is a fully passive brake based rehabilitation robot that uses passive alignment mechanisms to account for glenohumeral mobilization (A. Stienen, E. Hekman, F. Van der Helm, G. Prange, M. Jannink, A. Aalsma, and H. Van der Kooij, "DAMPACE: Dynamic force-coordination trainer for the upper extremities," in Rehabilitation Robotics, 2007, ICORR 2007, IEEE 10th International Conference on, 2007, pp. 820-826). The robot has 4 DoFs controlled DoF, in which 3 DoFs is on the shoulder and 1 DoF on the elbow. However, there is also a 2 DoF self-alignment mechanism on the shoulder which can account for scapulohumeral rhythm. Furthermore, Dampace possesses a passive gravity compensation mechanism which allows only a small portion of the robot weight be transmitted by the user.

Limpact (A. Stienen, E. Hekman, H. ter Braak, A. Aalsma, F. van der Helm, and H. van der Kooij, "Design of a rotational hydroelastic actuator for a powered exoskeleton for upper limb rehabilitation," Biomedical Engineering, IEEE Transactions on, vol. 57, no. 3, pp. 728-735, 2010) is an active exoskeleton based on the mechanical design of Dampace. This exoskeleton also features passive alignment for the shoulder joint and is hydraulically actuated. Passive alignment mechanisms cannot assist/resist patients during glenohumeral mobilization exercises. Moreover, such mechanisms cannot bear large forces.

In addition to joint correspondence, minimizing the weight of the exoskeleton has been an active research topic. L-exos robot uses a cable driven actuation system to place the motor of the robot outside the exoskeleton and decrease the weight (A. Frisoli, M. Bergamasco, M. Carboncini, and B. Rossi, "Robotic assisted rehabilitation in virtual reality with the L-EXOS." Stud Health Technol Inform, vol. 145, pp. 40-54, 2009).

Similar to L-exos, CADEN-7 is another cable driven exoskeleton (J. Perry, J. Rosen, and S. Burns, "Upper-limb powered exoskeleton design", Mechatronics, IEEE/ASME Transactions on, vol. 12, no. 4, pp. 408-417, 2007). With regard to light weight and high backdriveability, CADEN-7 is different from the L-exos with an additional joint on the wrist mechanism, correspondingly allows a wider range of exercises.

Another example of upper-extremity rehabilitation robots is the T-WREX (R. Sanchez, J. Liu, S. Rao, P. Shah, R. Smith, T. Rahman, S. Cramer, J. Bobrow, and D. Reinkensmeyer", Automating arm movement training following severe stroke: Functional exercises with quantitative feedback in a gravity-reduced environment", Neural Systems and Rehabilitation Engineering, IEEE Transactions on, vol. 14, no. 3, pp. 378-389, 2006). T-WREX robot has 2 motors to activate the shoulder joint and a third motor is attached serially to move the whole shoulder mechanism in a circular trajectory. In total, the shoulder joint of the robot consists of 4 DoFs, in which two of them is coupled; therefore, the robot cannot fully correspond to human shoulder for all patients.

SAM exoskeleton manages mobility in addition to being light weight (P. Letier, M. Avraam, S. Veillerette, M. Horodinca, M. De Bartolomei, A. Schiele, and A. Preumont", SAM: A 7-DoF portable arm exoskeleton with local joint control", in Intelligent Robots and Systems, 2008. IROS 2008. IEEE/RSJ International Conference on, 2008, pp. 3501-3506). The robot is 7 DoFs mechanism, in which 3 DoFs are allocated for shoulder joint movements. Consequently, although SAM offers mobility, it cannot preserve joint correspondence for ergonomic therapy. Another consideration for rehabilitation exoskeleton design is to achieve high stiffness.

The ABLE exoskeleton, which has 4 DoFs, is designed to carry high forces acting on the hand module of the robot (P. Garrec, J. Friconneau, Y. Measson, and Y. Perrot, "ABLE, an innovative transparent exoskeleton for the upper-limb", in Intelligent Robots and Systems, 2008, IROS 2008, IEEE/RSJ International Conference on, 2008, pp. 1483-1488). Since the whole arm of the robot is modeled as 4 DoFs, the robot cannot fully sustain joint alignment.

Figure 4A:
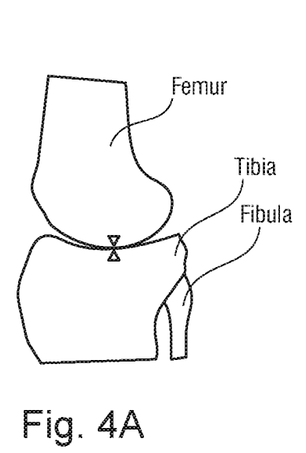
FIGS. 4A and 4B are a schematic representation of anterior-posterior translation during flexion/extension movement of the knee joint.
Figure 4B:
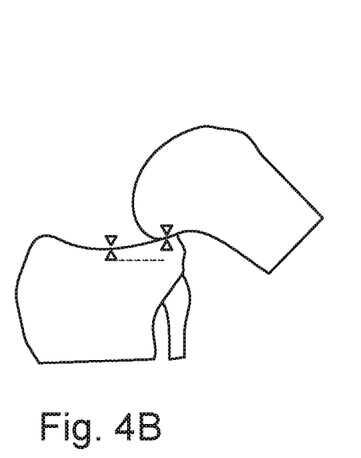

As in the case with the shoulder joint, biomedical studies indicate that the rotation axis of the knee joint also translates significantly during knee flexion and extension. The translation of the joint axis, called anterior-posterior translations, is depicted in FIGS. 4A and 4B. The kinematic models of the knee suggest that the magnitude of anterior-posterior translations can exceed 19 mm for a healthy human (Y. Li, J. Huegel, V. Patoglu, and M. O'Malley, "Progressive shared control for training in virtual environments", in EuroHaptics conference, 2009 and Symposium on Haptic Interfaces for Virtual Environment and Teleoperator Systems. World Haptics 2009, Third Joint, 2009, pp. 332-337). The amount of translation changes with flexion and extension angle and is unique to every individual, since it strongly depends on the size and orientation of the bones and the shape of articulated surfaces. Moreover, in practice, the alignment of human joint with robot axis cannot be handled precisely, since the exact joint center of human cannot be determined from outside the body.

Even though several recent studies have concentrated in the complex movement of the shoulder joint, there exist no lower-limb exoskeletons or joint specific rehabilitation devices for the knee joint that can accommodate anterior-posterior translations. The most popular lower-limb rehabilitation robot, Lokomat (R. Riener, L. Lünenburger, and G. Colombo, "Human-Centered Robotics Applied to Gait Training and Assessment," Veterans Admin, Journal of Rehabilitation Research and Development, 2006; and G. Colombo, M. Joerg, R. Schreier, and V. Dietz, "Treadmill training of paraplegic patients using a robotic orthosis," Journal of Rehabilitation Research and Development, vol. 37, no. 6, pp. 693-700, 2000), employs a DC motor driven simple revolute joint at its knee joint. Another well known gait rehabilitation robot, LOPES gait trainer (J. F. Veneman, "Design and evaluation of the gait rehabilitation robot lopes", Ph.D. dissertation, Enschede, December 2007, available under: http://doc.utwente.nl/58093/), utilizes series elasticity with antagonistic actuation to enable variable stiffness of the knee joint but models the kinematics of human knee as a pure rotary motion. The ERF knee (C. Mavroidis, et al., "Smart portable rehabilitation devices", Journal of NeuroEngineering and Rehabilitation, vol. 2, no. 1, p. 18, 2005, available under: http://www.jneuroengrehab.com/content/2/1/18), a joint specific, portable mechanisms for knee exercises, is constructed using an electro-rheological fluid based rotary actuator which also employs a simple hinge model for the knee. Unlike active rehabilitation robots, the complex movement of the knee is widely acknowledged and such movements are integrated in the design of most prosthetics and orthotics devices. For instance, the Jaipur knee ("Jaipur knee," http://remotiondesigns.org/jaipurknee.html), a knee prosthesis designed for amputees, mimics the movements of human knee by changing its center of rotation during movement. Similarly, self-adjusting orthoses have been proposed for the rehabilitation of knee joint (V. Cai, P. Bidaud, V. Hayward, and F. Gosselin, "Design of self-adjusting orthoses for rehabilitation", in Proceedings of the 14th IASTED International Conference on Robotics and Applications, 2009, pp. 215-223). It is to be noted that these are passive devices and cannot actively intervene to help patients to complete rehabilitation exercises.

SUMMARY OF THE INVENTION

The above mentioned problem is solved by an exoskeleton comprising
a) a joint element (2), that interacts directly or indirectly with a human's joint via an end-effector mount (4), wherein
b) the end-effector mount (4) is arranged to perform an arbitrary planar parallel movement in a plane, allowing superimposed translational and rotational movements of the end-effector mount (4) relative to a body (3) of the joint element (2).

Particularly it is solved by an exoskeleton for humans comprising a joint element that interacts directly or indirectly with a human's joint via an end-effector mount, wherein the end-effector mount is arranged to perform an arbitrary planar parallel movement in a plane, allowing superimposed translational and rotational movements of the end-effector mount relative to a body of the joint element. Such a set-up of an exoskeleton allows for an excellent adjustment of the joint axes, i.e. the exoskeleton's and the human's joint, guaranteeing simultaneous translational and rotational movements. Particularly the exoskeleton is self-aligning to the movements of a human's joint independent from differences in the attachment of the exoskeleton to the body and anatomical differences of the patients.

Preferably the joint element comprises a parallel mechanism, preferably a 3-RPR, 3-RRR, 3-PRR, 3-RRP, or 3PRP mechanism. Such parallel mechanism enables arbitrary movement and rotation in a plane allowing the desired movement of the end-effector mount.

Preferably the end-effector mount comprises at least three translational axes, wherein the axes are rigidly connected to the end-effector mount, wherein the axes are arranged parallel to plane of the arbitrary planar parallel movement of the end effector and wherein the axes are arranged having an angle to each other.

In a preferred embodiment, the end effector comprises three translational axes and the angle between two axes is 100°-140°, preferably 120°. The use of three axes ensures a geometrically defined movement of the end-effector mount while simultaneously minimizing the friction. The angle range between the axes further supports this definition of movement and improved friction.

Preferably the exoskeleton's joint element is self-aligning with respect to the human's joint that it interacts with. This is one of the advantages of the current device, as the set-up of phase can be significantly shortened as compared to the one required when working with current rehabilitation devices.

Preferably the axes are respectively guided by linear bearings, wherein the linear bearings are independently movable on one or more circular path(s) relative to the body, wherein the circular paths are arranged in parallel to the plane of the arbitrary planar parallel movement of the end-effector mount. This construction of the joint element provides an improved kinematics for allowing an arbitrary planar parallel movement in a plane of the end-effector mount.

Preferably, the linear bearings are movable along one common circular path. This provides for a compact construction, however, different circular paths can also be envisioned, wherein, for example, the range of the end-effector mount is specifically increased only in one direction.

Preferably, the linear bearings of the exoskeleton are respectively supported by a rotational bearing with respect to the circular path(s), wherein the rotation axes of the rotational bearings is arranged perpendicular to the plane of the arbitrary planar parallel movement of the end-effector mount.

Preferably the axes comprise straight links that are supported in corresponding openings of the linear bearings. Preferably, the rotational bearings are connected to co-centred rings.

Preferably one or more or all of the linear bearings of the exoskeleton are actively independently driven along the circular path(s) by respective motors that preferably drive said co-centred rings. This way, a human's joint can be actively moved in its natural complexity, comprising superimposed translational and rotational movements.

In another embodiment one or more or all of the linear bearings of the exoskeleton are actively independently driven along the circular path(s) by cable based actuators that preferably drive said co-centred rings. Different actuation and transmission methods are possible including electric motors, cables, springs, hydraulics or the like.

In another embodiment the joint element is passively driven by arranging the end-effector mount of the exoskeleton so as to drive one or more or all of the linear bearings by the movements of the human's joint within the plane of the planar parallel movement. The joint element thus allows to be moved passively by translational movements of the human's joint. This can be used to measure the possible motions or forces or both of a human's joint or to apply a resistance to the human's movements by means of the exoskeleton.

Preferably one or more or all linear bearings are resisted with resisting elements like springs. By these resisting elements the exoskeleton can for example be uses as measuring device that measures under load or as training device.

Preferably the exoskeleton further comprises force application means for exerting a resistance to the induced movement of the linear bearings. These means can again be helpful for diagnostic, but in particular also for training purposes. In a particular embodiment the exoskeleton comprises a force/torque sensor attached to the end-effector mount for measuring the force/torque exerted to or by the human's joint.

Preferably one or more linear bearings are actively independently driven and the remaining linear bearings are resisted with resisting elements like springs or brakes. In this embodiment some degrees of freedom are actuated and other degrees of freedom are resisted with springs, brakes or the like.

Preferably the exoskeleton further comprises measuring devices for measuring or registering the motion, force or their relation of the human's joint. This is useful for diagnostic purposes as well as for the determination of the progress during rehabilitation. By measuring the relationship between human's joint motion and human's joint force cases like impedance/tonus measurements are possible.

The above mentioned problems are also solved by using the above defined exoskeleton for actively moving of a human's joint and/or measuring a human's joint mobility and/or measuring a human's exerted joint force and/or measuring the relationship between human's joint motion and human's joint force and/or passive application of resistance to movements of a human's joint.

BRIEF DESCRIPTION OF THE FIGURES

In the following preferred embodiments of the invention are disclosed with reference to the figures.

DESCRIPTION OF PREFERRED EMBODIMENTS

In the following preferred embodiments of an exoskeleton for humans is described with reference to the figures. Features of one embodiment can be used in other embodiments, too, if applicable.

The exoskeleton 1 can be used at many human joints, including but not limited to knee, shoulder, hip/pelvis, ankle, and spine.

a. Design of the 3-DoF Self-Aligning Joint Element

Figure 13:
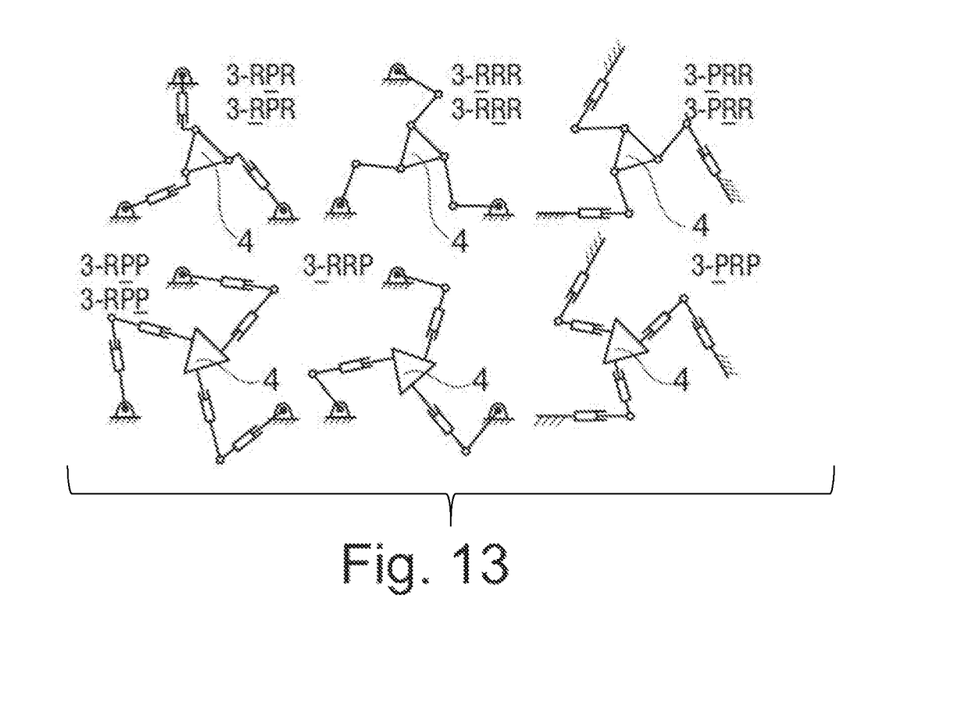
FIG. 13 shows schematic representations of six different parallel mechanisms that can be used as joint element of an embodiment of the exoskeleton according to the invention.

In general a parallel mechanism, as illustrated in FIG. 13 in six variations, can be used as underlying mechanism for implementing a joint element 2 for an exoskeleton 1 according to the invention. The use of such a kinematics in an exoskeleton 1 for rehabilitation, human augmentation, human measurement and many other purposes ensures ergonomy, large range of motion for joint movements, the ability to deliver and measure joint translations together with joint rotations, allows an ease of attachment due to no calibration requirements and many other advantages. It should be noted that the exoskeleton can of course also be used for animals.

A 3-RRP mechanism is preferred as the underlying mechanism for implementation of self-aligning joint element, since this mechanism is capable of sustaining all necessary movements to cover the complex movement of the joints whose axis of rotation are not fixed. In particular, the 3-RRP planar parallel mechanism possesses 3 DoF, which include translations in plane and rotation along perpendicular axis. Thanks to its kinematic structure with close kinematic chains, the 3-RRP mechanism features high bandwidth and position accuracy when compared with its serial counterparts. Moreover, the workspace of 3-RRP mechanism covers a large range of rotations, which is necessary for implementation of the shoulder joint whose rotation typically exceeds 180 during flexion and extension exercises. 3-RRP means that the mechanism comprises 3 joints, wherein each of the three joints allows rotation around two different rotational axes and allows displacement along one prismatic axis. The underlining indicates that one rotational axis is actuated. In the example shown in FIGS. 6, 7A and 7B the 3-RRP mechanism comprises three axes 16, 26, 36 that are respectively guided by three joints (bearings 10, 20, 30) which respectively rotate around a vertical axis through point O causing circular paths 14, 24, 34 of the bearings 10, 20, 30 ("R"), additionally rotate around vertical rotational bearings 12, 22, 32 ("R") and finally allow a linear displacement ("P") of links 17, 27, 37 within the bearings 10, 20, 30. The links 17, 27, 37 are collinear with the respective axes 16, 26, 36.

Figure 6:
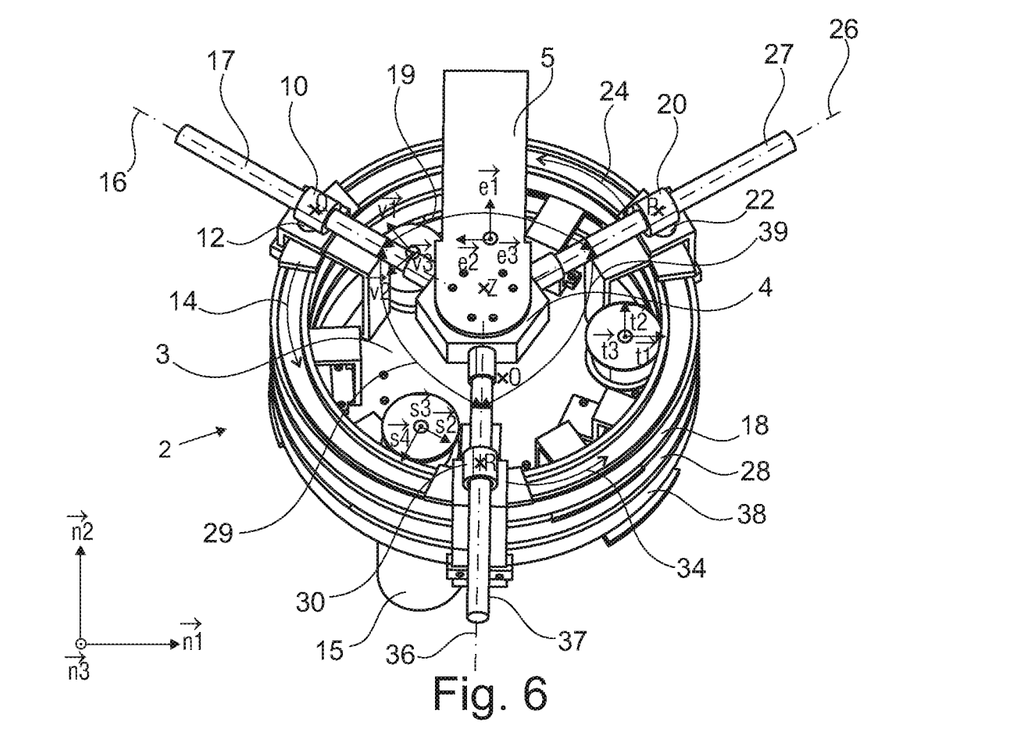
FIG. 6 shows an embodiment of a joint element of the exoskeleton of FIG. 5 illustrating the axes and angles used.

As it can be seen in FIG. 6 the 3-RRP mechanism used in the joint element 2 consists of five rigid bodies 3, 18, 28, 38 and a symmetric body 4. Body 3 represents the fixed frame, bodies 18, 28 and 38 have simple rotations about the fixed link about point O, while the symmetric end effector mount 4 is attached to bodies 18, 28 and 38 through linear bearings 10, 20, 30 and rotational bearing 12, 22, 32 collocated at points P, Q and R, respectively. The common out of the plane unit vector is denoted by $\vec{k}$ and basis vectors of each body are indicated in FIG. 6. In the figure, the point O is fixed in body 3, point P is fixed in body 28, point Q is fixed in body 18, point R is fixed in body 38 and point Z is fixed in end effector mount 4.

Dimensions of the mechanism are defined as follows: The fixed distance OP is defined as $l_1$, OQ is defined as $l_2$ and OR is defined as $l_3$, while the distance ZP is defined as $s_1$, ZQ is defined as $s_2$ and ZR is defined as $s_3$. The angle between the line I and $\vec{t_1}$ vector is $q_1$, the angle between I $\vec{s_1}$ and is $q_2$ and the angle between I and $\vec{v_1}$ is $q_3$. All angles are positive when measured counter clockwise.

For the kinematic analysis, the inputs to the mechanism are set as the angles $q_1$, $q_2$ and $q_3$ (i.e. the links S, T and V are actuated) and their time derivatives. At the initial configuration $\vec{e_i}$ vector is parallel to $\vec{n_1}$. The output of the system is defined as the position of the end-effector mount point Z, when measured from the fixed point O and the orientation of body E, measured with respect to body N. In particular, the scalar variables for outputs are defined as $$x = \vec{r}^{OZ} \cdot \vec{n_1}, \; y = \vec{r}^{OZ} \cdot \vec{n_2}, \text{ and } \theta = a\tan2\left(\frac{\vec{e_2} \cdot \vec{n_1}}{\vec{e_2} \cdot \vec{n_2}}\right)$$

where $\vec{r}^{OZ}$ is the position vector between points O and Z.

b. Kinematics of the 3-RRP Mechanism

Both forward and inverse kinematics of the exoskeleton are derived at configuration and motion levels, respectively.

1) Configuration Level Kinematics: To ease calculations, three auxiliary reference frames, namely K, L and M are defined as: $\vec{k_1}$ extends from Z to P, $\vec{l_1}$ extends from Z to S and $\vec{m_1}$ extends from Z to R, while $\vec{k_3} = \vec{l_3} = \vec{m_3} = \vec{n_3}$. Using the auxiliary reference frames, the vector loop equations that govern the geometry of the mechanism can be expressed as $$x\vec{n_1} + y\vec{n_2} + s_1\vec{k_1} - l_1\vec{t_1} = \vec{0} \quad (1)$$

$$x\vec{n_1} + y\vec{n_2} + s_2\vec{l_1} - l_1\vec{s_1} = \vec{0} \quad (2)$$

$$x\vec{n_1} + y\vec{n_2} + s_3\vec{m_1} - l_3\vec{v_1} = \vec{0} \quad (3)$$

Expressing the vector loops in one of the frames (typically in 3), these vector equations yield 6 independent scalar equations, which form the base for solution of configuration level kinematics.

a) Configuration Level Forward Kinematics: Three vector equations that are derived in the previous subsection yield to six nonlinear scalar equations with six unknowns. Given $q_1$, $q_2$ and $q_3$, solving these nonlinear equations analytically for x, y and $\theta$ (and intermediate variables $s_1$, $s_2$ and $s_3$) yields $$x = -\frac{M}{\sqrt{(3)(K^2 + L^2)}} \quad (4)$$

$$y = c_{22} - \frac{K}{L}c_{21} - \frac{KM}{\sqrt{(3)}L(K^2 + L^2)} \quad (5)$$

$$\theta = \tan^{-1}\left(\frac{K}{L}\right) \quad (6)$$

where $$K = c_{12} + c_{32} + \sqrt{3}c_{31} - 2c_{22} - \sqrt{3}c_{11}$$

$$L = c_{11} + c_{31} + \sqrt{3}c_{12} - 2c_{21} - \sqrt{3}c_{32}$$

$$M = L(L - \sqrt{(3)}K)c_{12} - L(K + \sqrt{(3)}L)c_{11}$$

$$-(L - \sqrt{(3)}K)Lc_{22} - Kc_{21})$$

$$c_{11} = l_1 \cos(q_1), c_{12} = l_1 \sin(q_1)$$

$$c_{21} = l_2 \cos(q_2), c_{22} = l_2 \sin(q_2)$$

$$c_{31} = l_3 \cos(q_3), c_{32} = l_3 \sin(q_3)$$

b) Configuration Level Inverse Kinematics: Given x, y and θ, the inverse kinematics problem can be solved analytically for joint rotations $q_1$, $q_2$ and $q_3$ by using the vector cross product method suggested by Chace (M. A. Chace, "Development and application of vector mathematics for kinematic analysis of three-dimensional mechanisms", Ph.D. dissertation, University of Michigan, 1964) as $$q_1 = \tan^{-1}\left(\frac{M_1}{L_1}\right) \quad (7)$$

$$q_2 = \tan^{-1}\left(\frac{M_2}{L_2}\right) \quad (8)$$

$$q_3 = \tan^{-1}\left(\frac{M_3}{L_3}\right) \quad (9)$$

where $$K_1 = x\sin\left(\theta + \frac{\pi}{3}\right) - y\cos\left(\theta + \frac{\pi}{3}\right)$$

$$K_2 = x\sin(\theta + \pi) - y\cos(\theta + \pi)$$

$$K_3 = x\sin\left(\theta - \frac{\pi}{3}\right) - y\cos\left(\theta - \frac{\pi}{3}\right)$$

$$M_1 = K_1\cos\left(\theta + \frac{\pi}{3}\right) - \sqrt{(l_1^2 - K_1^2)}\sin\left(\theta + \frac{\pi}{3}\right)$$

$$L_1 = -K_1\sin\left(\theta + \frac{\pi}{3}\right) - \sqrt{(l_1^2 - K_1^2)}\cos\left(\theta + \frac{\pi}{3}\right)$$

$$M_2 = K_2\cos(\theta + \pi) - \sqrt{(l_2^2 - K_2^2)}\sin(\theta + \pi)$$

$$L_2 = -K_2\sin(\theta + \pi) - \sqrt{(l_2^2 - K_2^2)}\cos(\theta + \pi)$$

$$M_3 = K_3\cos\left(\theta - \frac{\pi}{3}\right) - \sqrt{(l_3^2 - K_3^2)}\sin\left(\theta - \frac{\pi}{3}\right)$$

$$L_3 = -K_3\sin\left(\theta - \frac{\pi}{3}\right) - \sqrt{(l_3^2 - K_3^2)}\cos\left(\theta - \frac{\pi}{3}\right)$$

2) Motion Level Kinematics: Motion level kinematic equations are derived by taking the time derivative of the vector loop equations derived for configuration level kinematics. Six independent scalar equations can be obtained by projecting the vector equations onto the $\vec{n}_1$ and $\vec{n}_2$ unit vectors.

a) Motion Level Forward Kinematics: Given actuator $\dot{q}_1$, $\dot{q}_2$ and $\dot{q}_3$, motion level forward kinematics $\dot{x}$, $\dot{y}$ and $\dot{\theta}$ problem can be solved for end-effector mount velocities (along with intermediate variables $\dot{s}_1$ $\dot{s}_2$ and $\dot{s}_3$) as $$\dot{X}_1 = A_1^{-1} B_1 \quad (10)$$

where $$A_1 = \begin{pmatrix} 1 & 0 & -s_1\sin\left(\theta + \frac{\pi}{3}\right) & \cos\left(\theta + \frac{\pi}{3}\right) & 0 & 0 \\ 0 & 1 & s_1\cos\left(\theta + \frac{\pi}{3}\right) & \sin\left(\theta + \frac{\pi}{3}\right) & 0 & 0 \\ 1 & 0 & -s_2\sin(\theta + \pi) & 0 & \cos(\theta + \pi) & 0 \\ 0 & 1 & s_2\cos(\theta + \pi) & 0 & \sin(\theta + \pi) & 0 \\ 1 & 0 & -s_3\sin\left(\theta - \frac{\pi}{3}\right) & 0 & 0 & \cos\left(\theta - \frac{\pi}{3}\right) \\ 0 & 1 & s_3\cos\left(\theta - \frac{\pi}{3}\right) & 0 & 0 & \sin\left(\theta - \frac{\pi}{3}\right) \end{pmatrix}$$

$$\dot{X}_1 = \begin{pmatrix} \dot{x} \\ \dot{y} \\ \dot{\theta} \\ \dot{s}_1 \\ \dot{s}_2 \\ \dot{s}_3 \end{pmatrix} \text{ and } B_1 = \begin{pmatrix} -l_1\dot{q}_1\sin(q_1) \\ l_1\dot{q}_1\cos(q_1) \\ -l_2\dot{q}_2\sin(q_2) \\ l_2\dot{q}_2\cos(q_2) \\ -l_3\dot{q}_3\sin(q_3) \\ l_3\dot{q}_3\cos(q_3) \end{pmatrix}$$

b) Motion Level Inverse Kinematics: Given the solution of motion level forward kinematics, the motion level inverse kinematics problem can be solved by trivial application of linear algebra; hence, the solution is omitted from discussion due to space considerations.

c. Embodiment of the Self-Aligning Joint Element

Figure 7A:
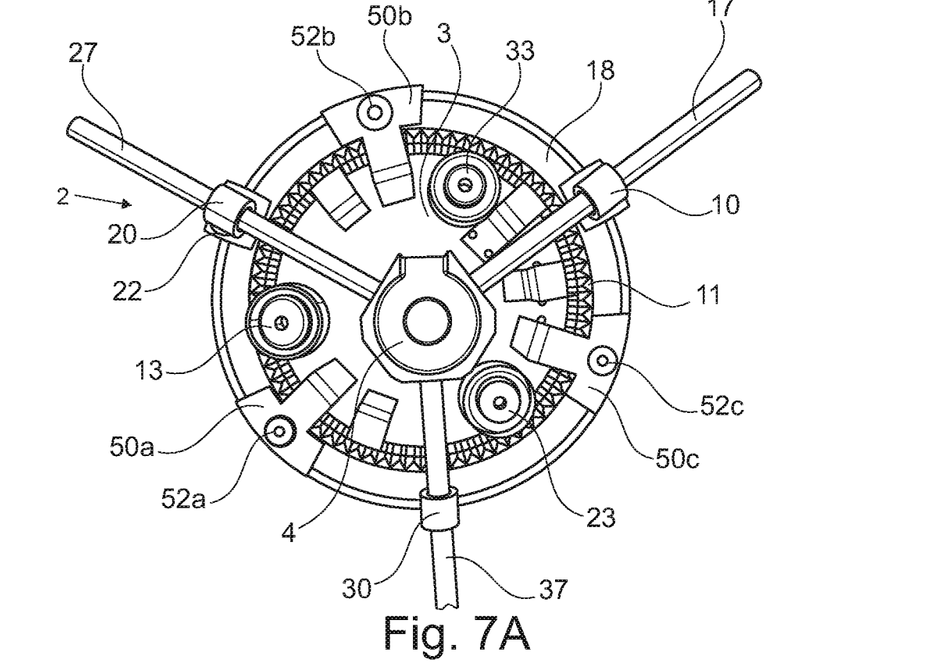
FIG. 7A shows the embodiment of the joint element of FIG. 6 in a top view.
Figure 7B:
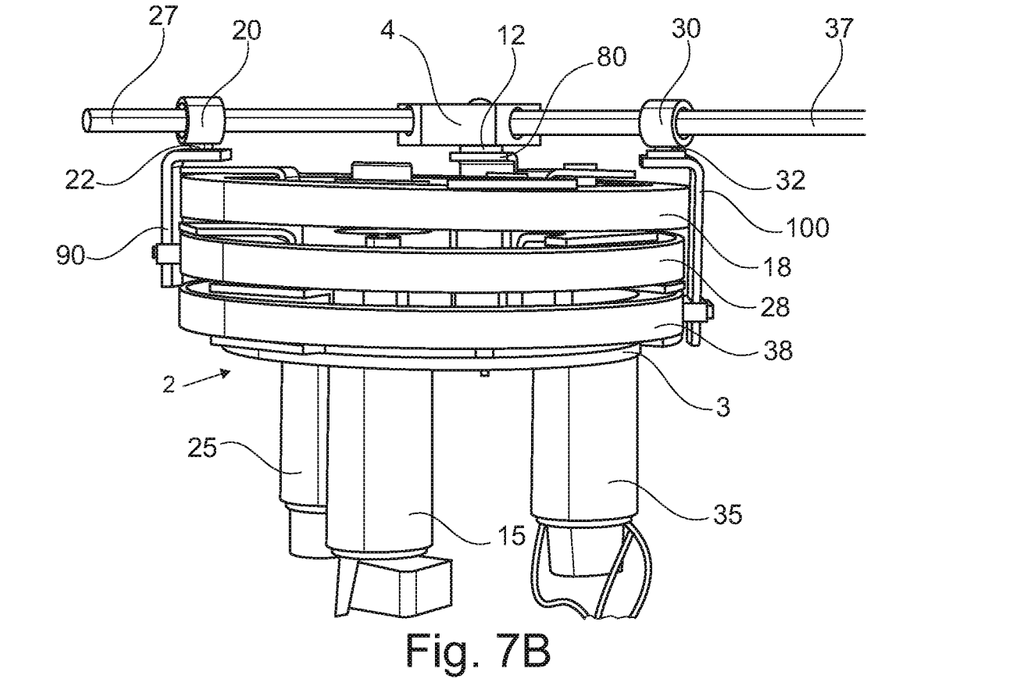
FIG. 7B shows the embodiment of the joint element of FIG. 6 in a side view. The embodiment uses three co-centered rings that are driven internally using a belt drive transmission. The rings are supported and aligned using custom brackets manufactured from aluminum and teflon ball rollers.

FIG. 7 shows a self-aligning joint element 2 of the exoskeleton 1 based on the 3-RRP mechanism that can be applied e.g. to knee or shoulder joints. The rings of the element 2 18, 28, 38 are manufactured from aluminum and each ring 18, 28, 38 is supported with three auxiliary parts 50a, 50b, 50c with three ball shaped teflon rollers 52a, 52b, 52c. A belt drive transmission is utilized to transfer power from direct drive motors 15, 25, 35 to the rings 18, 28, 38 using timing belts 11 that are respectively fixed to the aluminum rings 18, 28, 38 and aluminum pulleys 13, 23, 33 that are respectively attached to the transmission axle of each direct drive motor 15, 25, 35. In the current embodiment, the transmission ratio is set to 25 for the shoulder and 5.6 for the knee joint application.

The belts 11 are placed inside the rings 18, 28, 38, such that the actuators of the robot can be located inside the rings, decreasing mechanism footprint. In contrast to direct drive actuation, belt drive provides torque amplification while simultaneously enabling concentric placement of the three rings 18, 28, 38. Belt drives are preferred due to their low cost and widespread availability with various sizes and properties. The movements of the rings 18, 28, 38 are transferred to an upper planar plane by using aluminum links 80, 90, 100 and these aluminum links 80, 90, 100 are merged with links 17, 27, 37, preferably carbon fiber tubes, via linear and rotational bearings. Finally, the carbon fiber tubes, that enable a low weight and high stiffness implementation of the end-effector mount 4, are connected to the end-effector mount 4 of the joint element 2 with 120° angle between each tube 19, 29, 39.

The exoskeleton is actuated using direct-drive graphite-brushed DC motors that possess 180 mNm continuous torque output. Direct drive actuators are preferred since they are highly back-driveable. Optical encoders attached to the motors have a resolution of 2000 counts per revolution, under quadrature decoding. The robot is designed to feature a symmetric structure, such that it possesses high kinematic isotropy and can be applied to both left and right limbs.

A first prototype of the self-aligning joint element has a large translational workspace, covering up to 120 mm translations along x and y axes for the shoulder or 180 mm translations along x and y axes for the knee joint application, respectively. The self-aligning joint element can also sustain infinite rotations about the perpendicular axis.

Figure 3A:
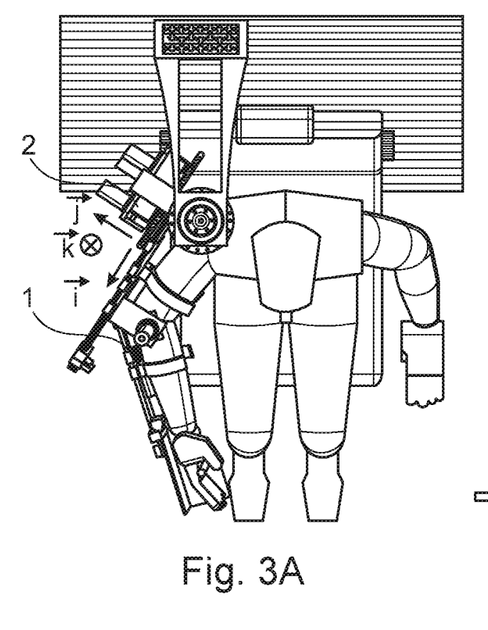
FIGS. 3A and 3B illustrate the conceptual design of an embodiment of a exoskeleton according to the invention, used as a shoulder-elbow exoskeleton.
Figure 3B:
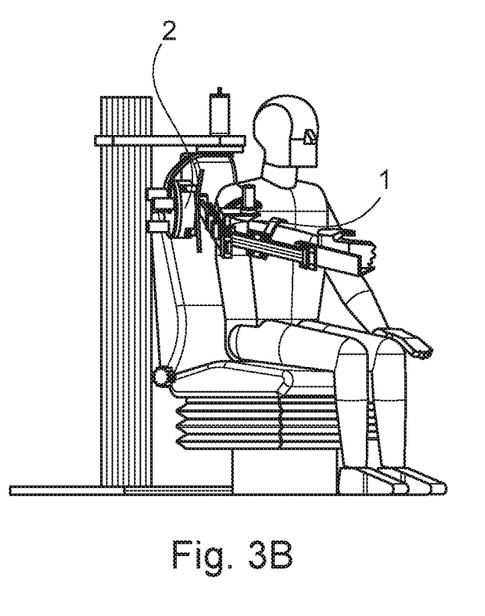
Figure 5:
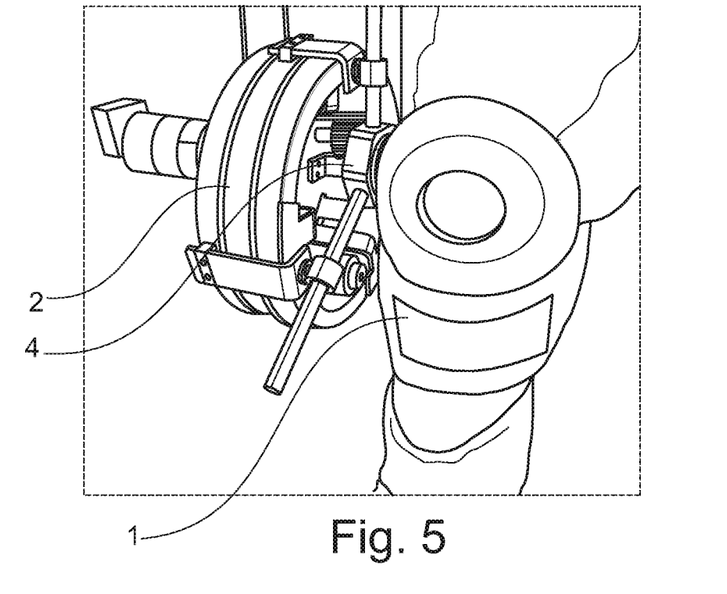
FIG. 5 shows a part of an embodiment of the exoskeleton according to the invention attached to a human knee.

FIG. 5 shows the exoskeleton attached to a human knee. Similarly, FIGS. 3A and 3B illustrate the self-aligning joint element implemented in a shoulder-elbow exoskeleton.

Figure 14:
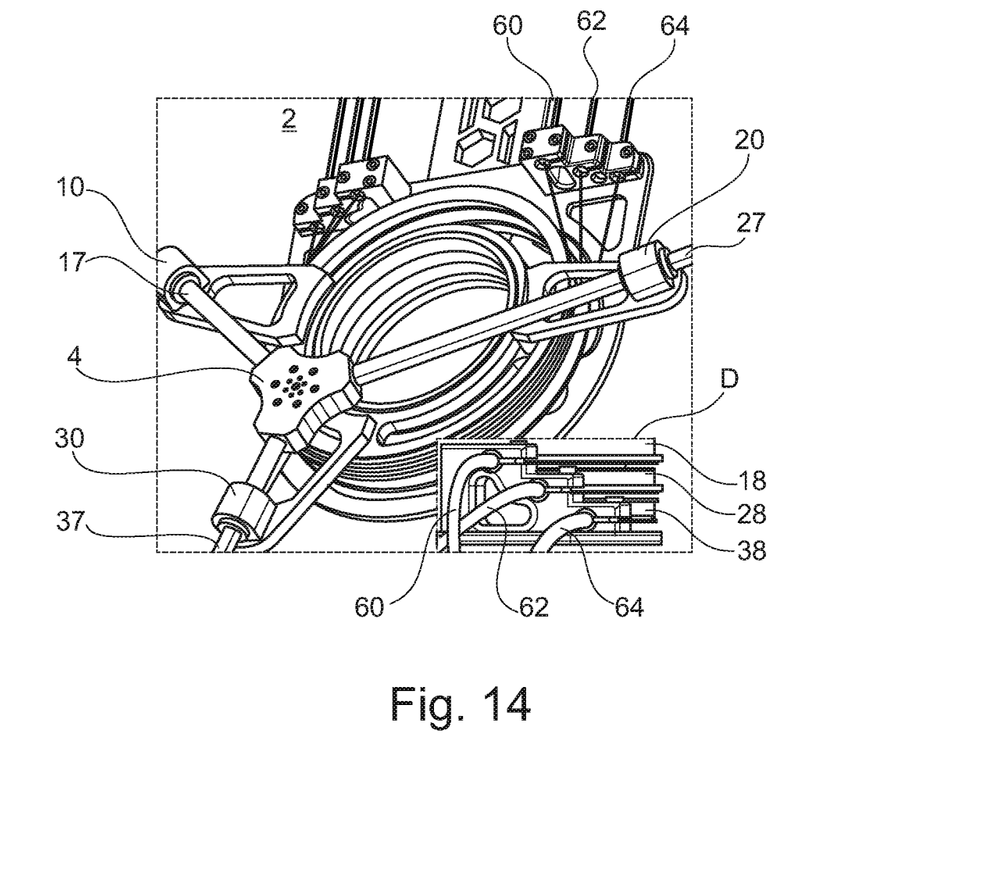
FIG. 14 shows a three-dimensional view including a detailed frontal view D of a joint element that is driven by cable based actuators.

FIG. 14 shows another embodiment of a joint element 2 that is driven via cable based actuators. The actuators (not shown) drive Bowden cables 60, 62, 64 that drive rings 18, 28, 38 in a pulley like fashion. To this end the inner cables of the Bowden cables 60, 62, 64 are guided around the outer circumference of the rings 18, 28, 38. As in the other embodiments the linear bearings 10, 20, 30 are attached to the driven rings 18, 28, 38 via links.

Of course, the Bowden Cables 60, 62, 64 can be used to transfer the movements of the end-effector mount 4 to sensors or resisting elements like springs or brakes (not shown) if the exoskeleton is passively driven by the human's motion attached to it.

d. Synthesis of an Impedance Controller

Figure 11:
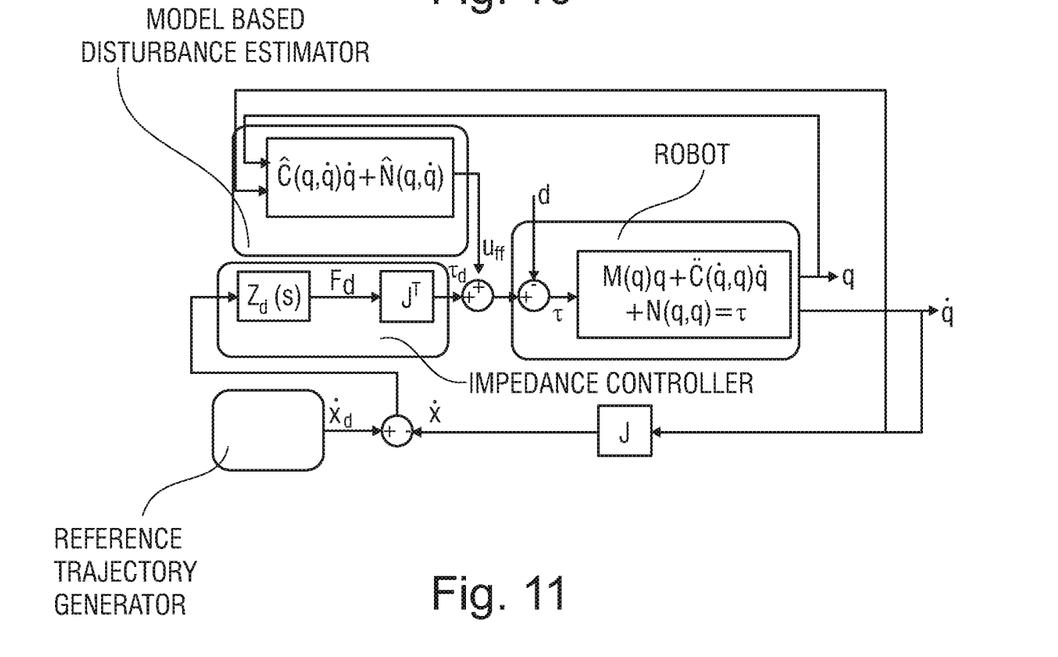
FIG. 11 is a block diagram of an impedance control architecture.

Thanks to use of back-driveable motors and utilization of low transmission ratio, the joint self-aligning joint element 2 and thus the exoskeleton 1 is highly back-driveable. As a result, it is possible to implement a model-based open-loop impedance controller for the self-aligning joint element 2 controlling interaction forces, alleviating the need for force sensors. The overall control architecture used to control the device is depicted in FIG. 11. Note that to increase the fidelity impedances rendered by the impedance controller, the end-effector mount 4 can still be equipped with a force/torque sensor 40, 41 enabling implementation of closed-loop impedance control.

In FIG. 11 $q$, $\dot{q}$ represent the actual position and velocity of the joints, $\dot{x}$ and $\dot{x}_d$ represent the actual and desired task space velocities, $F_d$ denotes desired forces acting on the self-aligning joint element 2, J is the self-aligning joint element Jacobian matrix, T and $T_d$ are the actual and desired actuator torques, M is the joint element mass matrix, C and $\hat{C}$ are the actual and modeled centrifugal and Coriolis matrices, N and $\hat{N}$ are $u_{ff}$ is the feed-forward compensation term from model-based disturbance estimator, while d represents the physical disturbances acting on the system. In the control architecture, the measured actuator velocities are multiplied with the Jacobian matrix and the actual end-effector mount velocities are obtained. The difference of the actual and desired end-effector mount velocities are fed to the impedance controller and desired forces are calculated. Then, desired forces are multiplied with the Jacobian transpose matrix and desired joint torques are obtained. The desired joint torques are added with the feed-forward torques estimated using the dynamic model of the joint element, that is, Coriolis, centrifugal and gravity matrices. Since disturbances acting on the joint element are physical and changes according to the environment, the total torque applied to the physical joint element includes these parasitic effects. If a force sensor 41 is available to measure the forces applied at end-effector mount 4, then the difference between the measured and desired values of the forces can be fed to a force controller, implementing a closed-loop controller.

Figure 12:
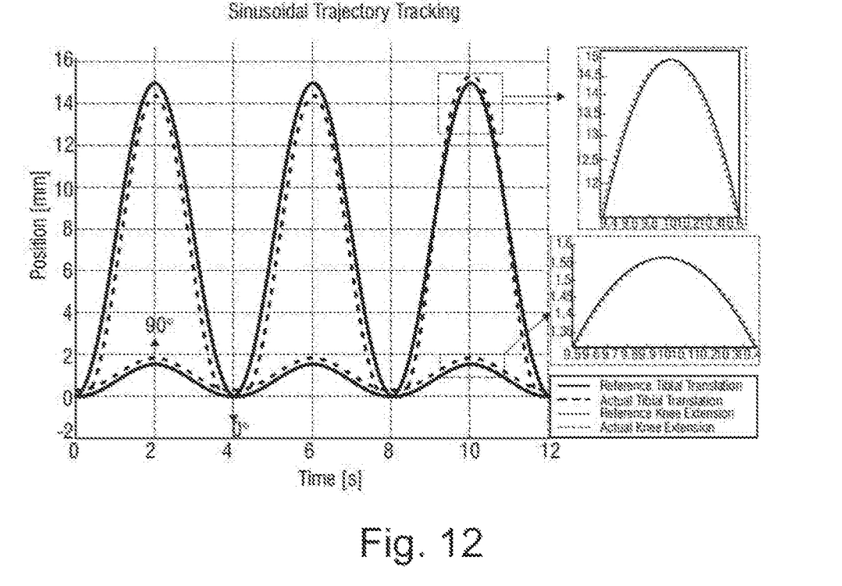
FIG. 12 illustrates a position tracking performance of a controller as tested using a typical trajectory for the knee joint. The path used to test position tracking performance is a rough visualization of tibial translation of the knee joint. In the desired path, the center of knee joint translates up to 15 mm during a 90° knee extension.

In order to verify the position tracking performance of the controller, it is tested using a typical trajectory for the knee joint. In particular, 90° rotation of the device is commanded simultaneously with a 15 mm translation of the rotation axis. The reference signal is commanded at a frequency of 0.5 Hz, which ensures sufficiently fast motion for knee rehabilitation. FIG. 12 depicts the tracking performance of the controllers. For the experiment presented, the RMS values of the error are calculated as 1.112% in translation and 0.006% in rotation.

e. Experimental Characterization

Table I presents the characterization results of a 3-RRP self-aligning joint element. Instantaneous peak and continuous end-effector mount forces along x and y directions are determined as 1 kN and 80 N, respectively. Similarly, instantaneous peak and continuous end-effector mount forces along the rotational axis are found as 170 Nm and 12.5 Nm, respectively. The end-effector mount resolutions are calculated to be 0.3252 mm along x, 0.5633 mm along y directions and 0.0031 rad on the rotational direction. The workspace of the self-aligning joint element 2 spans a range from −60 mm to 60 mm along x and y directions, while the joint element is capable of performing infinite rotations about the perpendicular axis. The stability limits for virtual wall rendering are observed as 50 kN/m along x direction, 42 kN/m along y direction and 1 kN/rad on rotation. Finally, the characterization results verify that the self-aligning joint element 2 is highly back-driveable and that can be moved with a 3 N force along x and y directions. As a result of being back-driveable, the exoskeleton 1 comprising the joint element 2 can ensure safety even under power loss.

TABLE I

CHARACTERIZATION OF THE 3-RRP SELF-ALIGNING JOINT

| Criteria | X | Y | Z |
| --- | --- | --- | --- |
| Inst. Peak Force | 1 [kN] | 1 [kN] | 170 [Nm] |
| Cont. Force | 80 [N] | 80 [N] | 12.5 [Nm] |
| End-Eff. Resol. | 0.013 [mm] | 0.022 [mm] | 0.0007 [rad] |
| Reach. Worksp. | −60 to 60 [mm] | −60 to 60 [mm] | ∞ [rad] |
| Virt. Wall Rend. | 50 [kN/m] | 42 [kN/m] | 1 [kNm/rad] |
| Back-driveability | 3 [N] | 3 [N] | 0.25 [Nm] |

Similarly, table II presents the experimental characterization results of a 3-RRP knee exoskeleton. Instantaneous peak and continuous end-effector mount forces along x and y directions are determined as 246.7 N and 18.4 N, respectively. Similarly, instantaneous peak and continuous end-effector mount forces along the rotational axis are found as 38.2 Nm and 2.85 Nm, respectively. These force values have also been experimentally verified at critical points of the prescribed workspace.

The values of the calculated end-effector mount resolutions, of the workspace spanned by the joint element 2, of the stability limits for virtual wall rendering and of the back-driveability correspond to those of the general characterization values (cf. above).

TABLE II

CHARACTERIZATION OF THE 3-RRP KNEE EXOSKELETON

Figure 8:
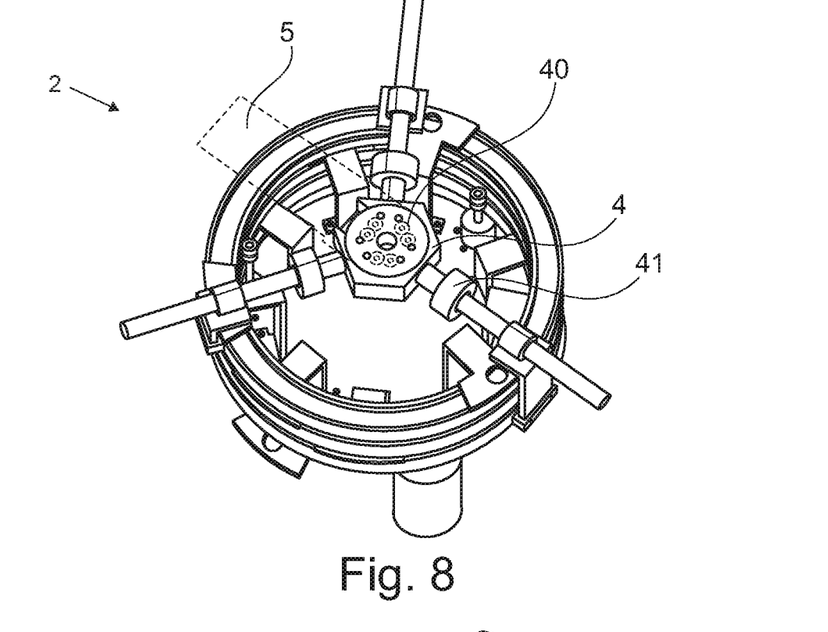
FIG. 8 shows another embodiment of a joint element of an exoskeleton according to the invention with built in force/torque sensing. Three load cells and a torque cell are attached to the end effector to measure forces/torques applied.

| Criteria | X | Y | Z |
| --- | --- | --- | --- |
| Inst. Peak Force | 246.7 [N] | 213.5 [N] | 38.2 [Nm] |
| Max. Cont. Force | 18.4 [N] | 16 [N] | 2.85 [Nm] |
| End-Eff Resol. | 0.058 [mm] | 0.100 [mm] | 0.0031 [rad] |
| Reach. Worksp. | −60 to 60 [mm] | −60 to 60 [mm] | ∞ [rad] |
| Virt. Wall Rend. | 50 [kN/m] | 42 [kN/m] | 1 [kNm/rad] |
| Back-driveability | 3 [N] | 3 [N] | 0.25 [Nm] | f. Built-In Force Sensing, Series-Elastic Actuation and Variable Impedance Actuation This section presents several design variations of the self-aligning joint element 2 of the exoskeleton 1. In particular, FIG. 8 presents an embodiment design with built in force/torque sensing, the design in FIG. 9 features series-elastic actuation and a variable-impedance design that utilizes antagonist actuation is depicted in FIG. 10.

The force sensing for close-loop force/impedance control is possible by attaching a multi-axis force/torque (F/T) sensor 40, 41 to the end-effector mount 4. On the other hand, thanks to the kinematic structure of the self-aligning mechanism, other low-cost solutions can also be implemented.

Firstly, instead of utilizing a multi-axis F/T sensor, low-cost, single-axis force and torque cells can be embedded to the end-effector mount 4 of the mechanism. One such embodiment with three load cells 41 (one of which is redundant) and one torque cell 40 is depicted in FIG. 8. Using the load cells 41 attached to rigid links, the task space forces acting on the robot can be easily estimated by calculating the component of the force vector along each link, while the torque applied to the end effector 5 can be measured directly using a torque cell 40.

Due to sensor actuation non-collocation, there exists an inherent upper limit for the closed loop gains of explicit force control. Since the closed loop gain is determined as a combination of the stiffness of the transducer and the controller gain, for high stiffness force sensors, only low controller gains can be used in order to preserve the stability of the system. Hence, the force controller becomes slow and its disturbance response may not be ideal. Series elastic actuation (SEA) is a force control strategy that transfers the stiffness of the force sensor to the gain of the controller so that a better controller performance can be achieved. Use of an SEA for force control is advantageous, since it alleviates the need for high-precision force sensors/actuators and allows precise control of the force exerted by the actuator through typical position control of the deflection of the compliant coupling element. In particular, SEA introduces a compliant element between the actuator and the environment, then measures and controls the deflection of it. That is, an SEA transforms the force control problem into a position control problem that can be addressed using well established motion control strategies. Other benefits of SEAs include low overall impedance of the system at the frequencies above the control bandwidth which avoids hard impacts with environment. The main disadvantage of SEAs is their low control bandwidth due to the intentional introduction of the soft coupling element. The force resolution of an SEA improves as the coupling is made more compliant; however, increasing compliance decreases bandwidth of the control system, trading off response time for force accuracy.

Figure 9:
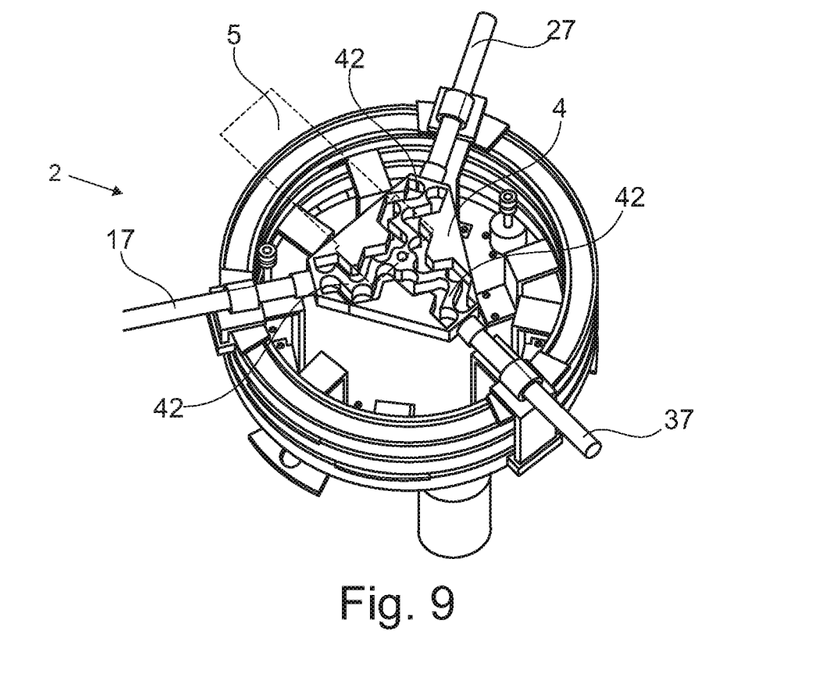
FIG. 9 shows another embodiment of a joint element of an exoskeleton according to the invention having series-elastic actuation of the self-aligning joint element. Deflections of a compliant mechanism attached to the end effector mount are measured to estimate forces/torques applied.
Figure 10:
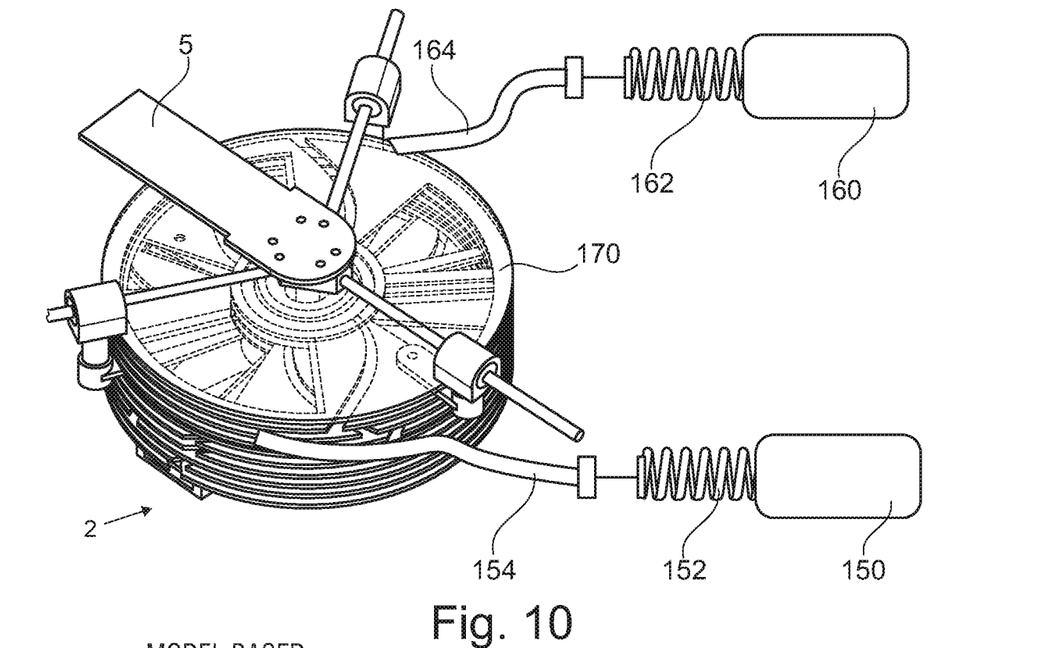
FIG. 10 shows another embodiment of a joint element of an exoskeleton according to the invention having a variable-impedance antagonist actuation of the self-aligning joint element via cable actuators.

FIG. 9 presents an embodiment of the self-aligning joint element 2 with SEA. In this embodiment, a compliant element 42 is placed between the links 17, 27, 37 and output 5 of the 3-RRP mechanism and deflection of this compliant mechanism is measured as low-cost means of obtaining the forces and torques acting on the joint element 2. In particular, the compliant body 42 in the figure is designed as a 3-RRR parallel mechanism, since this mechanism allows translations in plane and a rotation along the perpendicular axis. Therefore, measuring the deflections of the compliant joints 42 that are attached to end-effector mount 4, it is possible to estimate all the forces and torques acting on the self-aligning joint 2. In particular, the fixed frame (end effector mount 4) of the compliant mechanism is attached to the rigid links 17, 27, 37 and the output of the compliant joint 42 is attached to the output of the 3-RRP mechanism (end-effector 5). The joints 42 of the compliant mechanism are designed as hinge-notch joints and the stiffness function of the joints and the task space stiffness of the compliant mechanism is derived as described in Kang (B. H. Kang, J.-Y. Wen, N. Dagalakis, and J. Gorman, "Analysis and design of parallel mechanisms with flexure joints", Robotics, IEEE Transactions on, vol. 21, no. 6, pp. 1179-1185, 2005). Independent joint displacements of the compliant mechanism can be measured using linear encoders and given the joint stiffness, end-effector mount F/T can be derived. The range of the measured forces depends on the compliant joint design, while the force resolution of the system depends on the encoder resolution.

While adding compliance to an actuator, different levels of stiffness are required for various interactions: Precise position control tasks with good disturbance rejection characteristics require actuators with high stiffness, while impacts can be better regulated using actuators with low stiffness. Therefore, variable stiffness actuators (VSAs) have been introduced. VSAs are special type of compliant mechanisms that feature adjustable stiffness via controlled "spring like" elements. While designing VSAs, it is preferable to be able to adjust stiffness independent of the configuration of the actuators. To achieve this goal, several different approaches have been proposed.

The most common approach to design of variable stiffness actuators is inspired from human muscles and utilizes antagonistic actuation. In one way of designing antagonistic actuators, two motors are connected to "spring like" compliant elements and these compliant elements are connected to the output link. The opposite movement of these two actuators creates compression forces on one element and tension on the other. It has been shown in literature that if the force function of the springs are non-linear (in particular, if it is quadratic), this conjugate actuator movement does not affect the configuration of the output link position but changes its stiffness. Similarly, if both actuators move in the same direction, the configuration of the output link is changed preserving its stiffness.

FIG. 10 depicts one sample embodiment of the variable impedance actuation for the self-aligning joint element 2. In this design, each of the three disks is composed of a combination of sub-disks 170 with special edges. The inner slots on the disks are used for the attachment of two Bowden cables 154, 164. The Bowden cables 154, 164 are working according to the antagonist principle and each cable can pull the disk up to 180°. The Bowden cables are attached to non-linear springs (or more generally impedances) 152, 162 to enable mechanical variable impedance actuation via actuators 150, 160.

The invention claimed is:

1. A powered exoskeleton configured to actively move a joint of a human, the exoskeleton comprising:
   a) a joint element configured to interact with a human's joint via an end-effector mount configured to be directly connectable to the human's joint, wherein
   b) the end-effector mount is arranged to perform an arbitrary planar parallel movement in a plane, allowing superimposed translational and rotational movements of the end-effector mount relative to a body of the joint element, wherein
   c) the joint element is configured to be actively driven by at last one back-drivable actuator for actively moving the human's joint; and
   d) the joint element is configured to be passively driven by the human for self-alignment of the exoskeleton to the human's joint.

2. The exoskeleton according to claim 1 wherein the joint element comprises a parallel mechanism.

3. The exoskeleton according to claim 1, wherein the end-effector mount comprises at least three translational axes, wherein the axes
   a) are rigidly connected to the end-effector mount;
   b) are arranged in parallel to the plane of the arbitrary planar parallel movement of the end effector; and
   c) are arranged having an angle to each other.

4. The exoskeleton according to claim 3, wherein the end effector mount comprises three translational axes and the angle between two axes is 100°-140°.

5. The exoskeleton according to claim 1, wherein axes are respectively guided by linear bearings, wherein the linear bearings are configured to be independently movable on one or more circular paths relative to the body, wherein the one or more circular paths are arranged in parallel to the plane of the arbitrary planar parallel movement of the end-effector mount.

6. The exoskeleton according to claim 5, wherein the linear bearings are movable along one common circular path.

7. The exoskeleton according to claim 5, wherein the linear bearings are respectively supported by rotational bearings with respect to the one or more circular paths, wherein the rotation axes of the rotational bearings are arranged perpendicular to the plane of the arbitrary planar parallel movement of the end-effector mount.

8. The exoskeleton according to claim 7, wherein the rotational bearings are connected to co-centered rings.

9. The exoskeleton according to claim 8, wherein one or more or all of the linear bearings are actively independently driven along the one or more circular paths by respective motors that drive said co-centered rings.

10. The exoskeleton according to claim 8, wherein one or more or all of the linear bearings are actively independently driven along the one or more circular path by cable based actuators that drive said co-centered rings.

11. The exoskeleton according to claim 5, wherein the axes comprise straight links that are supported in corresponding openings of the linear bearings.

12. The exoskeleton according to claim 5, wherein the joint element is configured to be passively driven by arranging the end-effector mount so that one or more or all of the linear bearings are configured to be driven by the movements of the human's joint within the plane of the planar parallel movement.

13. The exoskeleton according to claim 5, wherein one or more or all of the linear bearings are resisted with springs or brakes.

14. The exoskeleton according to claim 5, wherein one or more linear bearings are actively independently driven and the remaining linear bearings are resisted with springs or brakes.

15. The exoskeleton according to claim 1, further comprising measuring devices for measuring or registering a motion of the human's joint, a force of the human's joint, or a relationship between the motion of the human's joint and the force of the human's joint.

16. The exoskeleton according to claim 1, wherein the exoskeleton is configured to actively move a knee, shoulder, elbow, pelvis, ankle or spine joint.

17. A method for using an exoskeleton of claim 1, the method comprising using the exoskeleton of claim 1 for executing the following steps:
   a) actively moving a human's joint; and/or
   b) measuring a human's joint motion; and/or
   c) measuring a human's exerted joint force;
   d) measuring the relationship between a human's joint motion and a human's joint force and/or
   e) passively applying resistance to movements of a human's joint.

* * * * *